United States Patent [19]
Macdonald et al.

[11] Patent Number: 6,037,056
[45] Date of Patent: Mar. 14, 2000

[54] TRANSVERSELY AND AXIALLY REINFORCED PULTRUSION PRODUCT

[75] Inventors: Frank J. Macdonald, Granville; Margaret M. Woodside, Pickerington; Scott R. Taylor, Bartlesville, all of Ohio

[73] Assignee: Owens Corning Fiberglas Technology, Inc., Summit, Ill.

[21] Appl. No.: 08/780,563

[22] Filed: Jan. 8, 1997

[51] Int. Cl.[7] .................................................. D02G 3/00
[52] U.S. Cl. ..................... 428/369; 428/379; 428/392; 428/396
[58] Field of Search .................... 428/369, 379, 428/392, 396

[56] References Cited

U.S. PATENT DOCUMENTS

| | | |
|---|---|---|
| Re. 30,770 | 10/1981 | Shobert et al. . |
| 4,085,307 | 4/1978 | Jenkins . |
| 4,160,148 | 7/1979 | Jenkins . |
| 4,318,762 | 3/1982 | Meyer . |
| 4,938,823 | 7/1990 | Balazek et al. . |
| 4,975,232 | 12/1990 | Hattori et al. . |
| 5,011,523 | 4/1991 | Roncato et al. . |
| 5,091,036 | 2/1992 | Taylor . |
| 5,225,140 | 7/1993 | Hayashikoshi et al. . |
| 5,268,158 | 12/1993 | Paul, Jr. . |
| 5,277,566 | 1/1994 | Augustin et al. . |
| 5,294,461 | 3/1994 | Ishida . |
| 5,310,600 | 5/1994 | Tsuya et al. . |
| 5,324,377 | 6/1994 | Davies . |
| 5,326,524 | 7/1994 | Rhodes, Jr. et al. ............... 264/294 |
| 5,433,419 | 7/1995 | Murakami . |

Primary Examiner—Christopher Raimund
Attorney, Agent, or Firm—Inger H. Eckert

[57] ABSTRACT

A reinforced pultrusion product comprises a polymeric matrix, at least one longitudinally oriented buckled reinforcement fiber embedded in said polymeric matrix, and at least one longitudinally oriented linear reinforcement fiber embedded in said polymeric matrix. The product is formed through a pultrusion process wherein a set of composite strands comprising reinforcement fibers and polymeric fibers are provided. A supplemental tension force is applied to a first subset of the composite strands. The composite strands are heated such that the polymeric fibers of a second subset of composite strands shrink to cause the reinforcement fibers in each of the second subset of composite strands to buckle. The heated set of composite strands, including the buckled reinforcement fibers, are consolidated in a pultrusion die.

11 Claims, 3 Drawing Sheets

6,037,056

TRANSVERSELY AND AXIALLY REINFORCED PULTRUSION PRODUCT

BACKGROUND OF THE INVENTION

The present invention relates to reinforced pultrusion products and, in particular, to a pultrusion product reinforced with glass fibers, wherein a portion of the glass fibers are buckled so as to provide transverse reinforcement, and a process for production of such a reinforced pultrusion product.

According to conventional pultrusion methodology, where it is required to axially and transversely reinforce thermoplastic or thermoset structures to provide transverse and axial strength, a woven, stitched, or non-woven fabric or mat of glass fibers is added to the thermoplastic or thermoset material. However, with thermoplastic pultrusion, it is preferable that the mat or fabric be pre-impregnated with the thermoplastic material or layered with thermoplastic fibers to get good wetout of the glass. Such pre-impregnation or layering steps represent an expensive and time consuming addition to conventional thermoplastic pultrusion processes.

Accordingly, there is a need for an inexpensive axially and transversely reinforced pultrusion product and a corresponding inexpensive and convenient pultrusion process for producing such a product.

SUMMARY OF THE INVENTION

This need is met by the present invention wherein a reinforced pultrusion product is provided including buckled, longitudinally oriented, reinforcement fibers. The pultrusion product is formed in a pultrusion apparatus by heating a set of composite strands while allowing polymeric fibers in some of the strands to shrink, thus causing associated reinforcement fibers within those composite strands to buckle.

In accordance with one embodiment of the present invention, a reinforced pultrusion product is provided comprising a polymeric matrix having a first end portion and a second end portion, and defining a pultrusion product axis extending from the first end portion to the second end portion, and at least one buckled reinforcement fiber embedded in the polymeric matrix and extending in a direction substantially parallel to the pultrusion product axis. The reinforced pultrusion product preferably further comprises at least one linear reinforcement fiber embedded in the polymeric matrix and extending in a direction substantially parallel to the pultrusion product axis.

The polymeric matrix may comprise a fiberizable thermoplastic material, e.g., a material selected from the group consisting of polyethylene terephthalate, polybutylene terephthalate, nylon, polypropylene, and polyphenylene sulfide. The buckled reinforcement fiber may comprise a material selected from the group consisting of glass, graphite, an aramid material, a metal such as steel, and a metal coated material. The linear reinforcement fibers may outnumber the buckled reinforcement fibers. Specifically, a ratio of linear to buckled reinforcement fibers may be approximately 85 to 15; however, the ratio may also be 15 to 85 or some other ratio depending upon the loading requirements of the intended application and design of the pultrusion product. The polymeric matrix may comprise about 20% to about 80% of the weight of the reinforced pultrusion product. The pultrusion product may comprise a sheet of material having a thickness of about 0.01" (0.254 mm) to about 1" (2.54 cm), preferably, about 0.05" (1.27 mm), and a width of up to approximately 6" (76.2 mm). It is contemplated by the present invention that the width of the pultrusion product is a function of the design of the pultrusion die utilized to form the reinforced product.

In accordance with another embodiment of the present invention, a reinforced pultrusion product comprises a polymeric matrix having a first end portion and a second end portion, and defining a pultrusion product axis extending from the first end portion to the second end portion, and at least one substantially non-linear reinforcement fiber embedded in the polymeric matrix. The non-linear reinforcement fiber extends from a first non-linear reinforcement fiber end to a second non-linear reinforcement fiber end along a non-linear path, wherein the non-linear path extends in a longitudinal direction, and wherein the longitudinal direction is substantially parallel to the pultrusion product axis. The reinforced pultrusion product preferably further comprises at least one axial reinforcement fiber embedded in the polymeric matrix. The axial reinforcement fiber extends from a first axial reinforcement fiber end to a second axial reinforcement fiber end along a linear path, wherein the linear path is substantially parallel to the pultrusion product axis.

In accordance with yet another embodiment of the present invention, a pultrusion process is provided wherein a set of composite strands are tensioned as they are consolidated in a pultrusion die, the process comprises the steps of: providing a set of composite strands wherein each of the strands comprises at least one reinforcement fiber and at least one polymeric fiber; designating one or more of the composite strands as a first subset of the set of composite strands and designating one or more of the composite strands as a second subset of the set of composite strands; applying a supplemental tension force to each of the one or more strands of the first subset of strands; heating the set of composite strands such that the at least one polymeric fiber of each of the one or more strands within the second subset of composite strands shrinks to cause the reinforcement fiber in each of the one or more strands of the second subset of composite strands to buckle; and consolidating the heated set of composite strands in a pultrusion die assembly to form a reinforced pultrusion product.

The polymeric fiber may comprise a polymeric fiber prestretched or partially or fully oriented. The supplemental tension force may range from about 2 lbf (8.88 N) to about 25 lbf (111 N) per strand. The supplemental tension force is preferably applied to each of the one or more strands of the first subset of strands by a tensioning assembly as the one or more strands of the first subset of strands pass through the tensioning assembly without applying a supplemental tension force to the one or more strands of the second subset of strands.

The heating step may comprise heating the composite strands to a preforming temperature, wherein the preforming temperature is less than the melting point temperature of the at least one polymeric fiber. The preforming temperature may be about 25° F. (15° C.) less than the melting point temperature of the at least one polymeric fiber. The consolidation step may comprise applying ultrasonic vibration to a portion of the pultrusion die.

In accordance with yet another embodiment of the present invention, a pultrusion apparatus is provided comprising: a composite strand supply assembly operative to provide first and second subsets of one or more composite strands. Each of the composite strands includes at least one reinforcement fiber and at least one polymeric fiber. The apparatus further includes a composite strand tensioning assembly arranged such that the one or more strands of the first subset of composite strands are tensioned by the tensioning assembly; a preforming assembly operative to heat the first and second subsets of composite strands such that the at least one polymeric fiber of each of the one or more strands of the second subset of composite strands shrinks to cause the at least one reinforcement fiber in each of the one or more strands of the second subset of composite strands to buckle; and a pultrusion die assembly operative to form a pultrusion product with the heated composite strands.

The composite strand supply assembly preferably comprises a plurality of discrete composite strand sources. The composite strand tensioning assembly preferably comprises a set of one or more tensioning bars or other tensioning devices in contact with the first subset of one or more composite strands. The preforming assembly may include a perforated plate adapted to arrange the first and second subsets of composite strands relative to one another. The pultrusion die assembly may comprise an ultrasonic pultrusion die assembly.

Accordingly, it is an object of the present invention to provide a low cost reinforced pultrusion product wherein a portion of its reinforcement fibers are buckled so as to provide transverse reinforcement, and a corresponding low cost process and apparatus for production of such a reinforced pultrusion product.

DETAILED DESCRIPTION AND PREFERRED EMBODIMENTS OF THE INVENTION

Figure 1:
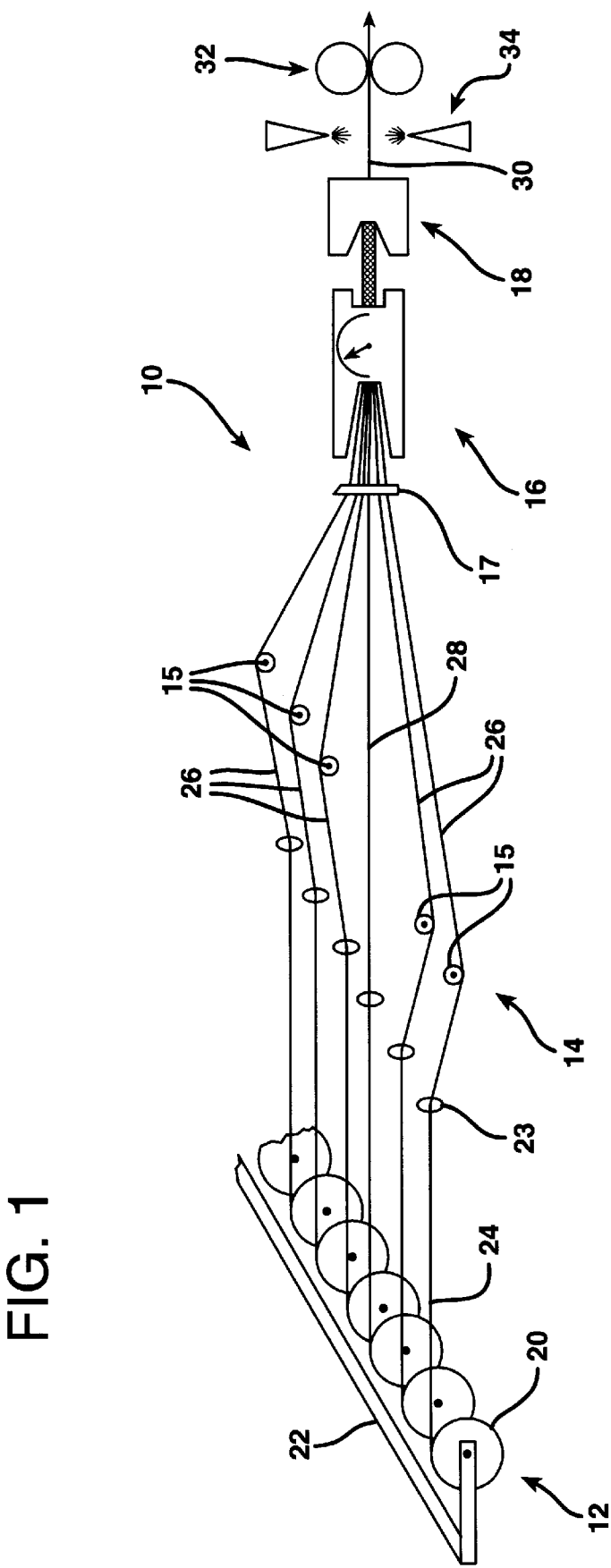
FIG. 1 is a schematic illustration, partially broken away, of a pultrusion process and apparatus according to the present invention.

Referring to FIG. 1, a pultrusion apparatus 10 according to one embodiment of the present invention comprises a composite strand supply assembly 12, a composite strand tensioning assembly 14, a preforming assembly 16, and a pultrusion die assembly 18.

The composite strand supply assembly 12 comprises a plurality of discrete composite strand sources in the form of a series of spools 20 mounted on a creel 22. Each spool 20 includes a composite strand 24 wound about the spool 20. Each composite strand 24 is fed through a corresponding guide eye 23. In this manner, the composite strand supply assembly 12 is operative to provide a first subset of composite strands 26 and a second subset of composite strands 28.

The composite strand tensioning assembly 14, which includes a set of tensioning bars or other tensioning devices 15, e.g. weights, spring loaded devices, in contact with the first subset of composite strands 26, is arranged such that the first subset of composite strands 26 are tensioned by the tensioning assembly 14. In a particular embodiment of the present invention, a total of 54 composite strands are supplied by the supply assembly 12. The first subset of composite strands 26 includes forty six (46) of the fifty four (54) composite strands 24 while the second subset of composite strands 28 includes the remaining eight (8) composite strands 24.

Each composite strand 24 includes reinforcement and polymeric fibers which are not shown in FIG. 1 because they would not be discernable in a figure of the illustrated scale. U.S. patent application Ser. No. 08/311,817, filed Sep. 26, 1994, now U.S. Pat. No. 5,626,643, the disclosure of which is incorporated herein by reference, teaches a manner of producing the composite strand 24. The reinforcement fibers comprise a material selected from the group consisting of glass, including S-glass and E-glass, a hollow fiber, graphite, an aramid material, metal or metal coated fibers, and any other fiberizable reinforcement material. The polymeric fibers comprise a material selected from the group consisting of polyethylene terephthalate, polybutylene terephthalate, nylon, polypropylene, polyphenylene sulfide and any other fiberizable thermoplastic material. Additionally, the polymeric fibers utilized in the present invention are those which tend to shrink under the heat of the preforming assembly 16. For example, polymeric fibers which are stretched or oriented during their production to yield higher tensile strength are subject to shrinkage upon heating and, accordingly, are suitable for use with the present invention.

In one embodiment of the present invention, the reinforcement fibers comprise E-glass fibers having a cross sectional diameter of about 15 microns to about 23 microns and the polymeric fibers comprise polypropylene fibers having like size to achieve good wetout. The composite strands may comprise about 15% to about 85% by weight reinforcement fibers but for better wetout and less waste, about 40% to about 60% polymer has achieved good product properties.

The preforming assembly 16 includes a perforated plate 17 having apertures through which respective composite strands 24 are threaded in order to position the composite strands 24 relative to one another in an arrangement approximating the final desired shape of a pultrusion product 30. The preforming assembly 16 is operative to heat the first and second subsets of composite strands 26, 28. Upon exposure to the heat generated by the preforming assembly 16 the polymeric fibers of the first and second subsets of composite strands 26, 28 shrink.

The shrinkage of the polymeric fibers in a particular composite strand 24 within the second subset of composite strands 28 creates a gathering force which causes corresponding reinforcement fibers in the same composite strand 24 to buckle, i.e., assume substantially non-linear orientations. The reinforcement fibers are forced to buckle in response to the gathering forces because the reinforcement fibers do not shrink with the polymeric fibers. The shrinkage of the polymeric fibers in a particular composite strand 24 within the first subset of composite strands 26 does not cause corresponding reinforcement fibers in the same composite strand to buckle because of the supplemental tension applied to the first subset of composite strands 26.

The pre-heated composite strands 24 are consolidated in the pultrusion die assembly 18 to form a pultrusion product 30 having a desired cross section defined by the particular shape of the pultrusion die assembly 18. A pulling roller assembly 32 pulls the pultrusion product 30 in an axial direction during pultrusion. This pulling tends to reduce the buckling created in the reinforcement fibers. Accordingly, the pultrusion die assembly 18 can be selected such that the buckling is not substantially reduced during pultrusion. The ultrasonic pultrusion die assembly disclosed in U.S. Pat. No. 5,091,036, to Taylor, wherein ultrasonic vibration is applied to a portion of a pultrusion die, is an example of a pultrusion apparatus which minimizes pulling tension through the die assembly and, as a result, is well suited for use with the present invention. It is contemplated by the present invention, however, that pultrusion dies other than ultrasonic pultrusion die assemblies may be used. A product cooling section 34, preferably a cooling water mist sprayer, is provided down line of the pultrusion die assembly 18 to cool the pultrusion product 30 at a rate faster than would be possible through mere exposure to ambient air.

In operation, with further reference to FIG. 1, although all of the composite strands 24 are tensioned to a degree as they are pulled through the pultrusion die assembly 18 by the pulling roller assembly 32, the tensioning devices 15 of the composite strand tensioning assembly 14 apply a supplemental tension force to the first subset of composite strands 26 as the first subset of strands 26 are pulled through the tensioning assembly 14. The supplemental tension force prevents buckling of the reinforcing fibers in the first subset of strands 26 as they pass through the preforming assembly 16 and the pultrusion die assembly 18. The magnitude of the supplemental tension force is at least large enough to ensure that the reinforcing fibers in the first subset of strands 26 do not buckle. For example, where the polymeric fibers comprise polypropylene and where reinforcement fibers comprise E-glass fibers, the supplemental tension applied to the first subset of strands 26 is approximately 10 lbf (44.4 N) while the tension in the second subset of strands 28 is merely that which is necessary to unload the strands from the composite strand supply assembly 12 and pull the strands through the preforming assembly 16 and the pultrusion die assembly 18.

As is noted above, because no supplemental tension is applied to the second subset of composite strands 28 in the illustrated embodiment and because the pultrusion die assembly 18 and the pulling roller assembly 32 are arranged such that the necessary pulling tension is not great enough to prevent at least some amount of buckling of the reinforcing fibers, the shrinkage of the polymeric fibers within the second subset of composite strands 28 causes the reinforcement fibers within the second subset of composite strands 28 to buckle, i.e., bend or warp. It is contemplated by the present invention that different levels of buckling may be achieved by varying the degree to which the polymeric fibers are prestretched or oriented. Specifically, a polymeric fiber which is stretched to six times its normal length during orientation of the fiber will cause proportionally more buckling than a polymeric fiber which is stretched to twice its normal length during orientation.

In the preforming assembly 16, the composite strands 24 are heated to a preforming temperature on the order of about 350° F. (175° C.) to about 400° F. (200° C.). For example, in one embodiment of the present invention, the preforming temperature is about 25° F. (15° C.) less than the melting point temperature of the polymeric fibers.

Figure 2:
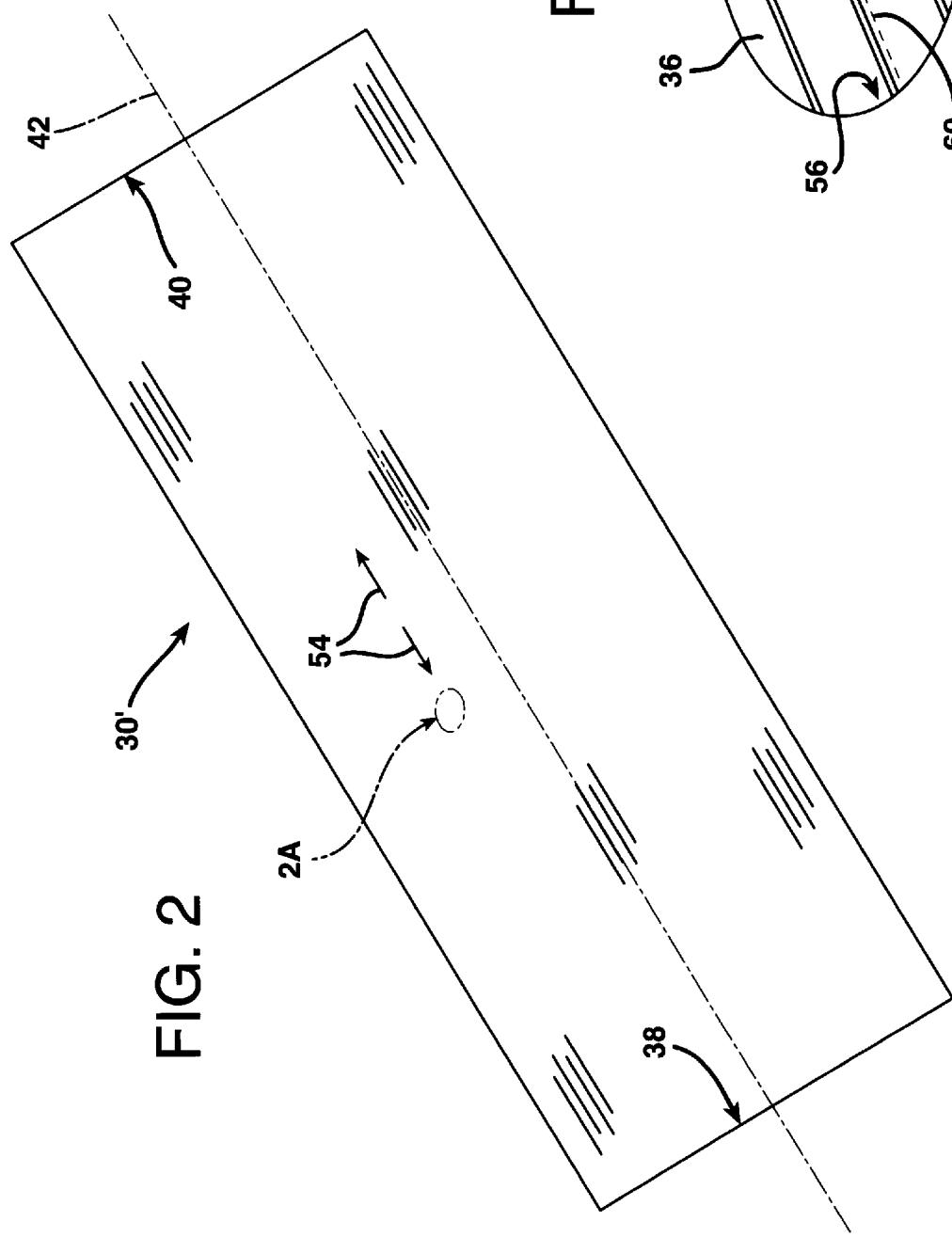
FIG. 2 is a schematic illustration of a reinforced pultrusion product according to the present invention.

Referring now to FIG. 2, where like elements are referenced by like reference numerals, a cut or discrete reinforced pultrusion product 30' formed from the pultrusion product 30 shown in FIG. 1 comprises a polymeric matrix 36 having a first end portion 38 and a second end portion 40 and defines a pultrusion product axis 42 extending from the first end portion 38 to the second end portion 40. The polymeric matrix is formed, through the pultrusion process described above, from the polymeric fibers present in the composite strand 24. At least one buckled reinforcement fiber 44 is embedded in, i.e., at least partially surrounded by, the polymeric matrix 36 and extends in a direction substantially parallel to the pultrusion product axis 42. The reinforced pultrusion product 30' further comprises at least one linear reinforcement fiber 46 embedded in the polymeric matrix 36 and extending in a direction substantially parallel to the pultrusion product axis 42. In the illustrated embodiment, the buckled and linear reinforcement fibers 44, 46 are formed, through the pultrusion process described above, from the reinforcement fibers present in the composite strands 24. The pultrusion product 30' is axially reinforced by the linear reinforcement fibers 46 and is transversely reinforced by the buckled reinforcement fibers 44.

The buckled reinforcement fibers 44 comprise substantially non-linear reinforcement fibers, each extending from a first non-linear reinforcement fiber end, indicated generally at 48, to a second non-linear reinforcement fiber end, indicated generally at 50, along a non-linear path, indicated generally by the dashed line 52. In the illustrated embodiment, the first and second non-linear reinforced fiber ends extend to the first and second end portions 38, 40 of the matrix 36. However, it is contemplated that the first and second non-linear reinforcement fibers may have a length which is less than the longitudinal length of the matrix 36 and, hence, would not extend to both end portions 38, 40 of the matrix 36. The non-linear path 52 generally extends in a longitudinal direction, indicated generally by arrows 54. The longitudinal direction 54 is substantially parallel to the pultrusion product axis 42. The linear reinforcement fibers 46 comprise axial reinforcement fibers, each extending from a first axial reinforcement fiber end, indicated generally at 56, to a second axial reinforcement fiber end, indicated generally at 58, along a linear path, indicated generally by dashed lines 60. The first and second axial reinforcement fiber ends 56, 58 extend to the first and second end portions 38, 40 of the matrix 36 in the illustrated embodiment. The linear path 60 is also substantially parallel to the pultrusion product axis 42.

The relative number of buckled and linear reinforcement fibers 44, 46 present in the reinforced pultrusion product may vary depending upon the desired degrees of transverse and axial reinforcement for a particular pultrusion product. In one embodiment of the present invention, the plurality of linear reinforcement fibers outnumber the buckled reinforcement fibers. Specifically, the ratio of linear to buckled reinforcement fibers is approximately 85 to 15. Similarly, the relative amounts of and placement of polymeric material and reinforcement fibers in the reinforced pultrusion product varies depending upon the desired properties of a particular pultrusion product. In one embodiment of the present invention, the polymeric matrix can vary but best results are achieved with about 40% to about 50% of the total weight of the reinforced pultrusion product comprising polymeric material. The dimensions of the pultrusion product itself also vary from application to application.

It is contemplated by the present invention that more-than one type of reinforcement fiber may be utilized within the pultrusion product 30' such that the reinforcement fibers include at least a first set of reinforcement fibers comprising a first reinforcement fiber material and at least a second set of reinforcement fibers comprising a second reinforcement fiber material. For example, since aramid fibers tend to be stronger but more expensive than many reinforcement fibers, to achieve increased strength at a lower cost, the pultrusion process described above may be adapted such that 10% of the reinforcement fibers are aramid fibers while the remaining reinforcement fibers are made from another appropriate material. Similarly, 10% of the reinforcement fibers could be a conductive material while the remaining reinforcement fibers are formed from another appropriate material.

It is further contemplated by the present invention that one or more non-composite reinforcing fiber strands may be combined with the composite strands during the pultrusion process such that the non-composite strands are embedded within the matrix of the final pultrusion product. The non-composite reinforcing fiber strands may be provided in the form of spools mounted on the creel 22. The reinforcing fiber strands may be formed from a material selected from the group consisting of glass, including S-glass and E-glass, hollow fibers, graphite, an aramid material, metal, or a metal coated material.

Figure 3:
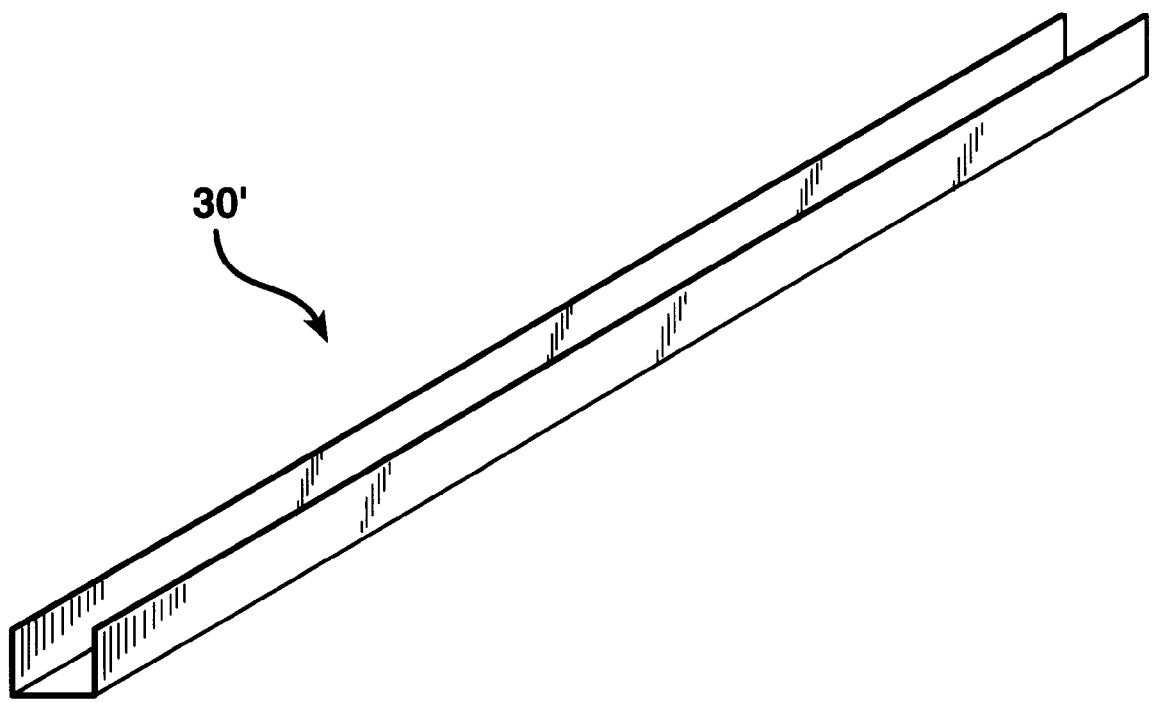
FIG. 3 is a perspective view of a reinforced pultrusion product according to the present invention wherein the product includes a U-shaped cross section.

Referring now to FIG. 3, it is contemplated by the present invention that the reinforced pultrusion product 30' may be of an elongated channel design incorporating a U-shaped cross section. In this manner, the reinforced pultrusion product 30' functions as a structural member resistant to torsional stresses. For example, although the number of tensioned and non-tensioned strands will vary according to the needs of the particular product, in one embodiment of the present invention incorporating the U-shaped cross section, 50% of the strands are tensioned and 50% of the strands are not tensioned.

Having described the invention in detail and by reference to preferred embodiments thereof, it will be apparent that modifications and variations are possible without departing from the scope of the invention defined in the appended claims. It is further contemplated that supplemental tension forces may be applied to the second subset of composite strands 28. However, the supplemental tensioning of the first subset of composite strands 26 should exceed that of the second subset of strands 28.

What is claimed is:

1. A reinforced pultrusion product comprising:
   a polymeric matrix having a first end portion and a second end portion, and defining a pultrusion product axis extending from said first end portion to said second end portion; and
   at least one buckled reinforcement fiber embedded in said polymeric matrix and extending in a direction substantially parallel to said pultrusion product axis, said reinforcement fiber being repetitively buckled along its length.

2. A reinforced pultrusion product as claimed in claim 1 further comprising at least one linear reinforcement fiber embedded in said polymeric matrix and extending in a direction substantially parallel to said pultrusion product axis.

3. A reinforced pultrusion product as claimed in claim 1 wherein said polymeric matrix comprises a fiberizable thermoplastic material.

4. A reinforced pultrusion product as claimed in claim 1 wherein said polymeric matrix comprises a material selected from the group consisting of polyethylene terephthalate, polybutylene terephthalate, nylon, polypropylene, and polyphenylene sulfide.

5. A reinforced pultrusion product as claimed in claim 1 wherein said buckled reinforcement fiber comprises a material selected from the group consisting of glass, graphite, an aramid material, a metallic material, and a metal coated material.

6. A reinforced pultrusion product as claimed in claim 2 wherein said at least one linear reinforcement fiber comprises a plurality of linear reinforcement fibers and wherein said plurality of linear reinforcement fibers outnumber said at least one buckled reinforcement fiber.

7. A reinforced pultrusion product as claimed in claim 6 wherein a ratio of linear to buckled reinforcement fibers is approximately 85 to 15.

8. A reinforced pultrusion product as claimed in claim 1 wherein said polymeric matrix comprises about 40% to about 50% of the weight of the reinforced pultrusion product.

9. A reinforced pultrusion product as claimed in claim 1 wherein said pultrusion product comprises a sheet of material having a thickness of about 0.01" (0.254 mm) to about 1" (2.54 cm) and a width of approximately 6" (15.24 cm).

10. A reinforced pultrusion product as claimed in claim 1 wherein a plurality of buckled reinforcement fibers are provided and wherein said plurality of buckled reinforcement fibers include at least a first set of reinforcement fibers comprising a first reinforcement fiber material and at least a second set of reinforcement fibers comprising a second reinforcement fiber material.

11. A reinforced pultrusion product comprising:
    a polymeric matrix having a first end portion and a second end portion, and defining a pultrusion product axis extending from said first end portion to said second end portion; and
    at least one buckled reinforcement fiber embedded in said polymeric matrix and extending in a direction substantially parallel to said pultrusion product axis, said reinforcement fiber being repetitively buckled along its entire length.

* * * * *